Aug. 19, 1930.  H. H. THOMPSON  1,773,412
GYROSCOPIC COMPASS
Filed Oct. 25, 1929  4 Sheets-Sheet 1

INVENTOR
Herbert H. Thompson

Aug. 19, 1930.  H. H. THOMPSON  1,773,412
GYROSCOPIC COMPASS
Filed Oct. 25, 1929  4 Sheets-Sheet 3

INVENTOR
Herbert H. Thompson

Aug. 19, 1930.  H. H. THOMPSON  1,773,412
GYROSCOPIC COMPASS
Filed Oct. 25, 1929  4 Sheets-Sheet 4

INVENTOR
Herbert H. Thompson

Patented Aug. 19, 1930

1,773,412

UNITED STATES PATENT OFFICE

HERBERT H. THOMPSON, OF MOUNTAIN LAKES, NEW JERSEY, ASSIGNOR TO SPERRY GYROSCOPE COMPANY, INC., OF BROOKLYN, NEW YORK, A CORPORATION OF NEW YORK

GYROSCOPIC COMPASS

Application filed October 25, 1929. Serial No. 402,392.

This invention relates to gyroscopic compasses and also has application to other gyroscopic navigational apparatus. The causes of deviation in a gyroscopic compass when mounted on a ship have been made the subject of many and exhaustive investigations. Among the fruitful causes may be recited the rolling and pitching of the ship and changes in latitude, of course, and speed of the ship. Permanent changes in the pointing of the compass due to the latitude and course and speed are perfectly determinable and the readings corrected automatically in the better type of compass. Deviations due to rolling and pitching have also been largely eliminated by improved designs of the compass. On recent tests, however, the Sperry type gyro compass in which the compass rotor is substantially balanced about a horizontal axis and the meridian seeking properties imparted thereto by an eccentric connection between the said gyroscope and a pendulous element or its equivalent, as shown in the U. S. patent to Elmer A. Sperry, No. 1,279,471, "gyroscopic compass", September 17, 1918, or in the Harrison and Rawlings No. 1,362,940, "gyroscopic compass", December 20, 1920, it has been found that unexplained oscillations of the compass were set up by acceleration of the ship in the broad sense, i. e. by either changes in the speed or course of the ship. When a ship changes course or speed, if such change has a component in the north-south direction, a permanent change in the settling point of the compass results as explained above. Ordinarily the compass is so designed that it will in a given latitude reach the new settling point by the time the ship has settled upon its new course or changed so that no deviations will be produced by this cause. In other words, the acceleration force set up by the turning or change in speed of the ship acting on the pendulous element or its equivalent about the horizontal axis of the compass is sufficient to turn the compass about the vertical axis to its new settling point by the time the ship has reached the new course or speed. This, of course, is entirely independent of the rate of acceleration or turning of the ship since the greater the acceleration the greater the force applied on the compass.

As stated above, however, in spite of the correct design in this particular, oscillations of the compass were found to be set up when rapid maneuvers were practiced. Upon analyzing the causes of such oscillations, it was found that when the ship accelerated in either direction, or turned, a slight tilt about the horizontal axis was produced showing the presence of a force about the vertical axis. As this force could only reach the compass through the connection between it and the pendulous element or its equivalent, it was naturally deduced that it must be due to the eccentricity of the coupling between the pendulous element and the gyro casing to which cause the damping of the compass of this type is due. The proper damping of the compass is, of course, as much a necessity as any other feature, since, without damping, oscillations of the compass would continue for hours rendering the same unfit for navigational purposes. By my invention I have devised a means for retaining a sufficient damping effect and at the same time have eliminated deviation of the compass due to acceleration of the ship by destroying its cause, namely, by eliminating entirely the effect of the damping means while the ship is accelerating and no longer. The oscillations above described, it will be understood, are small and not sufficient to interfere with the ordinary navigational uses of the compass. For ordnance work, however, wherein a fixed baseline is desired, the elimination of such oscillations is highly desirable.

A further object of the invention is to decrease the time taken for a compass to settle on the meridian, when once displaced, i. e., to render the compass dead beat. While this is possible with the present Sperry compass by increasing the eccentricity of the point of connection between the ballistic and sensitive element, if such is attempted, the disturbing forces due to the causes above outlined are multiplied to such an extent as to interfere with the proper functioning of the compass, even for navigational purposes. By destroying such disturbing forces, I am enabled to increase the damping effect and thereby render the compass dead beat. The importance of this feature will be realized when it is remembered that the ordinary compass requires about two hours to settle within half a degree of the meridian, if displaced 25° or more, while the same compass, if dead beat, would settle in less than one hour.

This application contains matter divided from my prior application No. 351,635, filed January 15, 1920, and is also filed as a continuation in part for joint application Serial No. 436,900, filed January 13, 1921.

Referring to the drawings in which what are now considered the preferred forms of the invention are shown:

Fig. 4ª is a detail in end elevation of a portion of Fig. 4.

I wish it understood, however, that the invention has application to other types of compass and to other damping methods than disclosed herein.

In the particular types of compasses shown, the sensitive element, so-called (is composed of the gyro casing 1 within which is enclosed the gyro rotor and electric motor for spinning the same (not shown). Said casing is mounted for oscillation about a horizontal axis upon pivots 2 and 3 within a vertical ring 4. Preferably said horizontal axis passes through or is slightly above the center of gravity of the rotor and the casing so that the compass is substantially balanced or at least only slightly pendulous about said axis. The vertical ring is supported for turning about a vertical axis within an outer follow-up ring or element 5, said element furnishing upper and lower guide bearings 6 and 7, respectively, for the vertical ring and upper thrust bearing 8, the vertical ring being preferably suspended from a member 9 to which upper ends of the suspension element 10 are secured. Said suspension element preferably consists of a bundle of fine torsionless wires. It will be understood that the follow-up element follows all azimuth movements of the sensitive element by reason of a power or follow-up motor 11 geared through pinion 12 on the motor armature and large gear 13 on the follow-up element. Said motor is actuated from contacts (not shown) operating between the sensitive and follow-up elements. All of such details are well known in the art and need not be further elaborated upon. (See patent to Sperry referred to above and also Sperry Patent No. 1,300,890 "navigational instruments", April 15, 1919).

Figures 1, 2, 3:
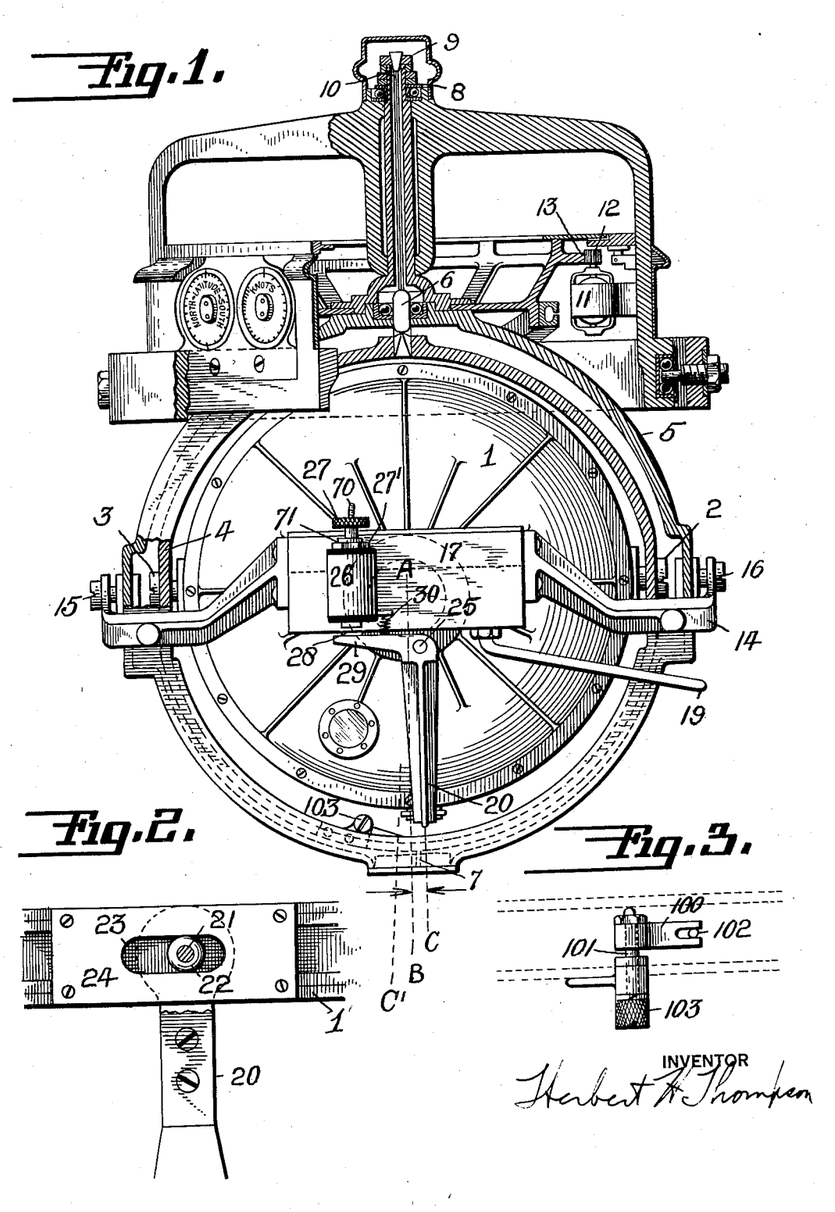
Fig. 1 discloses a north elevation, partly in section, of a Sperry gyro compass in the form of the general type disclosed in the patent to Rawlings and Harrison with my invention applied thereto.
Fig. 2 shows a detail of the connection between the follow-up element and the gyro casing.
Fig. 3 is a detail of the lock for maintaining the compass in an upright position.

Meridian seeking properties may be imparted to the gyroscope in many different ways. One method known as the virtual ballistic is illustrated in Fig. 1. This comprises a frame 14 pivotally supported on axis 15, 16 on the follow-up frame 5. Said frame is shown as equipped with a pair of containers 17 and 18 situated on opposite sides of the gyroscope in the north-south direction. Said containers preferably contain mercury or other heavy liquid and are connected by a pipe 19. Said element is connected to the sensitive element through an arm 20 which carries at its lower portion a pin 21 on which is rotatably mounted a ball or roller 22. Said roller engages in a slot 23 in a plate 24 secured to the bottom of the rotor casing.

The theory of operation of such compass is set forth more completely in the Rawlings and Harrison patent above referred to. Since it is in unstable equilibrium, lock 100 is pivoted on the follow-up ring 5 at 101 to engage a pin 102 on the arm 20 or rotor casing. The lock may be turned by thumb piece 103 or with a screw driver.

Said connection with the rotor casing is preferably slightly offset from the vertical line A—B passing through the center of gravity of the sensitive element, as shown by angle C, said angle being made sufficient to secure the proper damping of the compass. This eccentric connection, both in this form of the invention and those subsequently described together with the pivoted frame 14, may be described broadly as a yielding connection between the follow-up frame 5 and the sensitive element.

As above explained, I prefer to provide means for eliminating the damping during the application of acceleration pressures due to acceleration of the ship. For this purpose I may pivotally mount the arm 20 on the casing 17 as shown at 25 so that the point of connection 21 between the mercury containers and the gyro casing may be shifted to reduce or eliminate the eccentricity of the connection. For this purpose I have shown an electromagnet 26 or other electromagnetic means, in circuit with a suitable means responsive to acceleration of the ship, mounted on a bracket 71 extending from box 17. Said magnet may be adjusted by means of the thumb nut 27 and lock nut 27' on either side of said bracket and threaded on stem 70 of said magnet. When excited said magnet attracts the armature 28 of bell crank lever 29 forming a part of the arm 20, thereby serving to move the point of connection to the left in Fig. 1 as far as desired, namely, from inclined line A—C to or near the vertical line A—B. The latter alternative may be found desirable in case appreciable deviation is produced by causes which it is impossible to remove, such as friction about the axes of support of the gyroscope. By moving the point of connection to the opposite side of the center line as indicated by line C' A, a corrective force will result, which would neutralize any deviating characteristics from other causes. A compression spring 30 may be provided to normally hold the arm in the position shown.

Figures 4, 4A, 5, 6, 7:
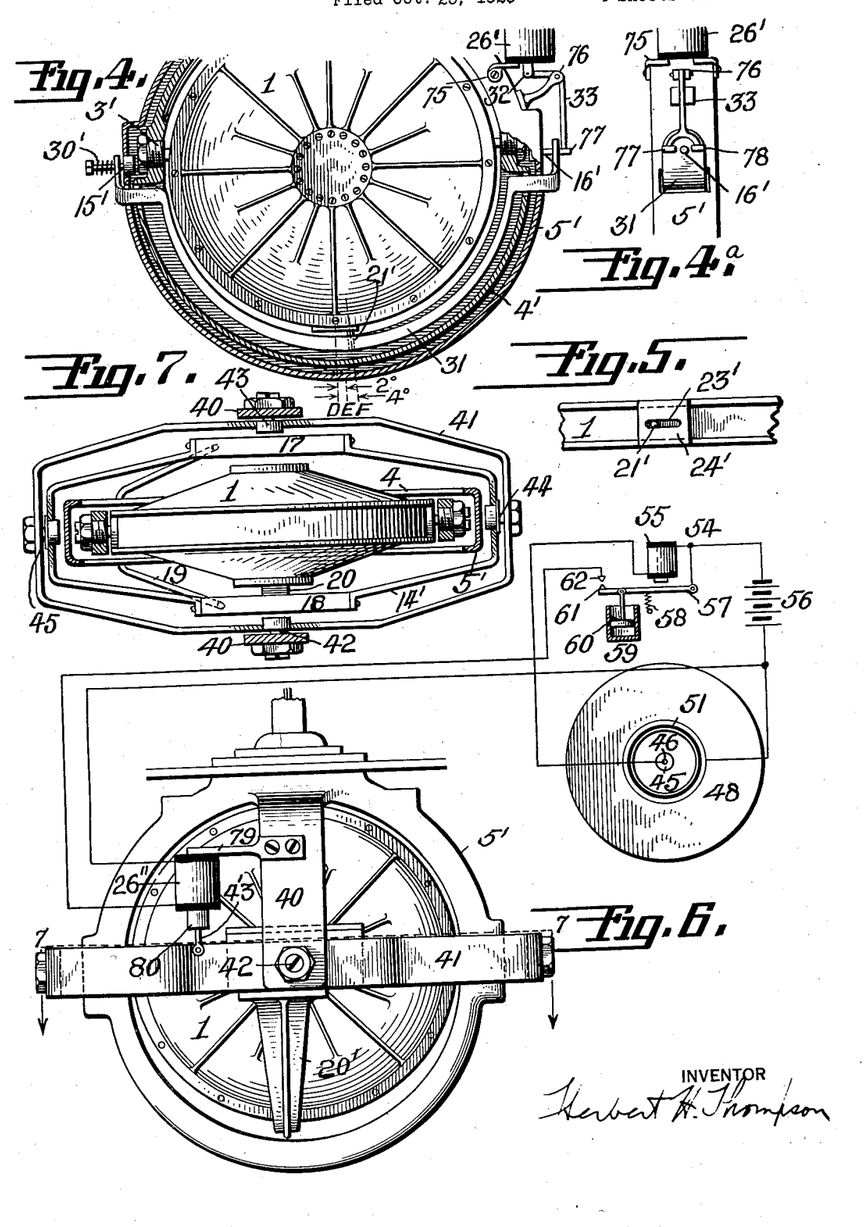
Fig. 4 is a north elevation, partly in section, of a portion of a Sperry gyro compass of the type employing a bail.
Fig. 5 is a detail of the connection between the pendulous element and the rotor casing.
Fig. 6 is a side elevation of a third application of my invention to a gyro compass showing diagrammatically one type of control means for the same in connection therewith.
Fig. 7 is a horizontal section taken approximately on line 7—7 of Fig. 6.

Another method of accomplishing this result applicable both to the form of invention described and to the form disclosed in said Sperry patent is shown in Fig. 4. In this figure a pendulous loop or bail 31 is pivotally mounted on the horizontal axis 15', 16' and is connected to the bottom of the rotor casing as before through an eccentric pin 21' on the bail working in a slot 23' in plate 24' on the bottom of the rotor casing.

According to this modification, the entire pendulous element or bail 31 is shifted laterally in order to shift the point of connection between the bail and the rotor casing. For this purpose the bail is shown as slidably mounted on the pivot pins 15', 16' being normally held in the position shown by compression spring 30'. The electromagnetic means 26' which serves to move the bail is secured to the follow-up frame 3' on a bracket 75. Said means is shown in the form of a solenoid having a movable core 32 pivoted to the bell crank lever 33, said lever being also pivoted on the follow-up frame on bracket 76. The lower end of the lever may be forked to straddle pin 16' and provided with anti-friction rollers 77 and 78.

Still a third method is shown in Figs. 6 and 7. These figures again illustrate a virtual ballistic type of compass employing mercury containers 17, 18. Instead of supporting said containers 17, 18 and their supporting frame 14' directly on the follow-up element 5, I prefer to mount said containers so as to be oscillatable about both horizontal axes. For this purpose I have shown the follow-up frame 5' as provided with additional downwardly extending arms 40 at substantially right angles to the plane of the ring 5'. Said arms pivotally support adjacent their lower ends an outer gimbal ring 41 on horizontal pivots 42, 43. Said ring in turn supports on horizontal pivots 44, 45 the frame 14' carrying the mercury containers 17 and 18.

According to this modification the arm 20' carrying the pin connected to the bottom of the gyro casing may be rigidly connected to the containers 17 and the point of connection shifted by tilting the gimbal ring 41 about axis 42, 43 through the required angle. This of course, will tilt the mercury containers 17 and 18 and the arm 20' connected thereto. A suitable solenoid 26" is shown as mounted on a bracket 79 on arm 40, the armature 80 of said solenoid being connected through a link 43' to said ring 41 at one end. In Fig. 6 also is shown diagrammatically a means responsive to acceleration of the ship for exciting the magnet and altering the damping of the compass. For actuating the magnets 26, 26' or 26", to vary the eccentricity of the connection, I may employ any means, automatic or otherwise, which will or may be brought into action temporarily when the ship changes speed or course. For this purpose I illustrated the automatic means shown diagrammatically in Fig. 8, comprising essentially a pendulous device mounted on a stabilized platform and arranged to be responsive to acceleration pressures. Preferably the device should be mounted near the center of the ship so that rolling and pitching will not displace the stabilized platform. As shown, the pendulous device comprises a metallic ball 45 suspended by torsionless filament 46 from an arm 47. Said arm is shown as mounted on a liquid container 48, while the ball has secured to the lower end thereof vanes 49 extending at angles to one another and immersed in the liquid 50 in such container so as to exert a strong damping effect upon the pendulum. Preferably a viscous liquid is employed. As stated, the container is preferably mounted on a stabilized platform. For furnishing such platform, I prefer to employ a gyroscopic pendulum of the type disclosed in the U. S. patent to M. M. Titterington, No. 1,324,482 "self damping gyro pendulum," dated Dec. 9, 1919, further particulars of which may be obtained by reference to said patent. The device consists essentially of a gyro rotor and enclosing casing 90 mounted for oscillation about horizontal axis 91 in gimbal ring 92, which in turn is mounted for oscillation about the second horizontal axis on pivots 93. The damping is governed by air jets issuing from nozzles 94 and 95 by means of a small auxiliary pendulum 96 controlling vanes 97 and 98.

A conducting element or ring 51 is supported around the mouth of said container 48 while current is also led into the ball 45 through the suspension 46 whenever the pendulum becomes inclined. Due to the ship's turning or change in speed, contact will be made between the pendulum and the ring 51 (see Figs. 6–8) and the circuit completed causing actuation of the magnet 26''. Since, however, the ship often yaws several degrees first in one direction and then in the other and also since temporary changes in speed occur, due to rough weather, I prefer to interpose between the acceleration responsive device and the magnet 26'' a delayed action device such as a delayed action relay 54 which may comprise a magnet 55 in circuit with said pendulum and the source of power 56 and armature 57. Said armature is normally held in the downward position by spring 58 and has preferably connected thereto a one way dash pot 59 which will resist upward movement of the armature but permit free downward movement due to the outwardly opening flap valve 60. Said armature carries contact 61 which is in contact with contact 62 in circuit with the magnet 26''. It will readily be seen, therefore, that the magnet 26'' will not be actuated unless the acceleration pressure is continued for a predetermined period, which is preferably longer than the pendulum would contact with the ring due to the temporary causes described or to rolling and pitching of the ship. Of course, by stabilizing the platform, inclinations of the pendulum are largely eliminated.

Figure 10:
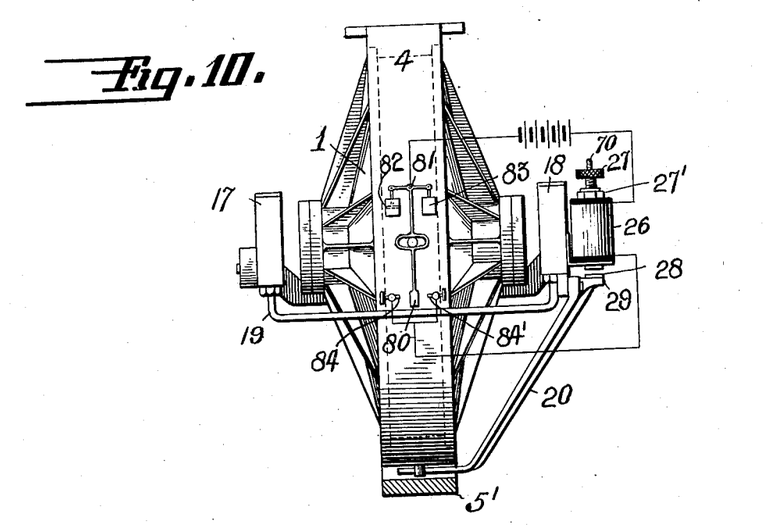
Fig. 10 shows still another alternative form of control means for the damping eliminator, as applied to the compass, the view being an east-west elevation.
Figure 11:
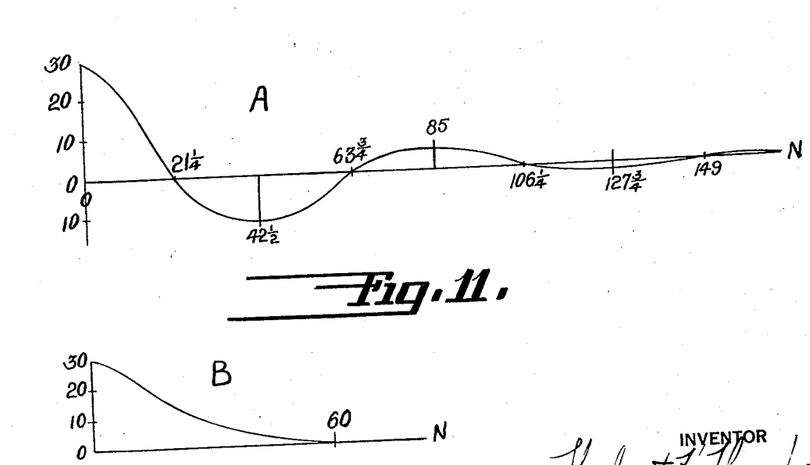
Fig. 11 is a diagrammatic view of settling curves:—(A) of the present form of Sperry compass, and (B) of my "dead beat" compass.

Since the invention is only concerned with the north-south component of changes in speed or course, and since the sensitive element of the compass itself forms a convenient stabilized platform in that plane, I may utilize a simpler level or pendulous control, such as disclosed in my aforesaid first filed application No. 351,635. Fig. 10 illustrates one such application of the invention, this view being taken at right angles to Fig. 1. The controller in this instance is the damped pendulum 80 shown as pivoted at 81 on the vertical ring 4 of the compass to swing in the N—S direction. The pendulum may be damped by means of small pistons 82 linked to the T-shaped end of the pendulum and working in dash-pots 83. The pendulum is shown as making contact at its lower end with one or the other of contacts 84—84' to excite the magnet 26 to eliminate the damping whenever there is an inclination of the pendulum in the N—S direction.

Figure 9:
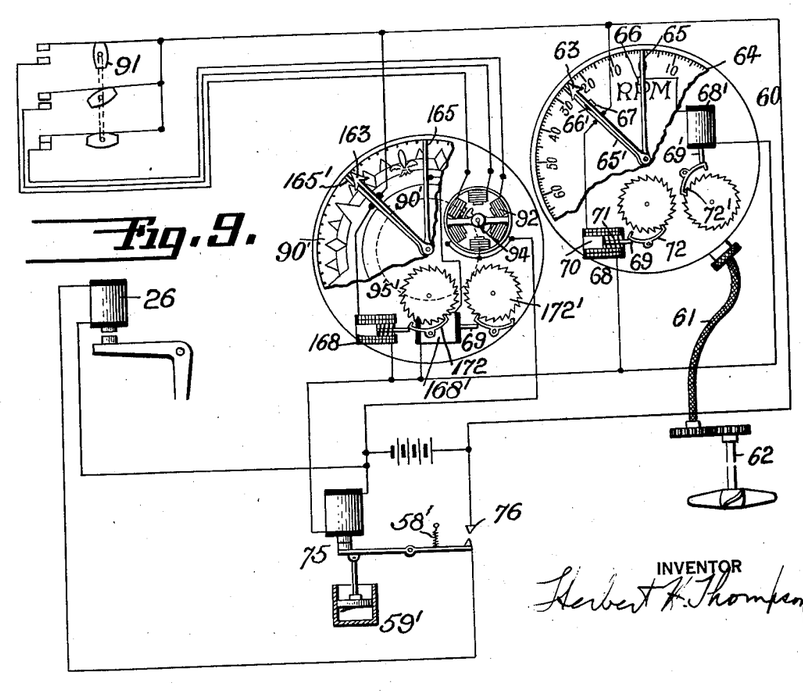
Fig. 9 is a diagrammatic view of an alternative form of control means for the compass.

Still another alternative, and in some respects preferable, means for bringing into action the damping eliminating means, such as suggested in Fig. 9, may be employed. In this figure, separate means are employed, the first of which is responsive only to the changes in speed of the ship and the second of which is responsive only to changes in the heading. The speed of the ship may be said in general to vary as the speed of the revolution of the engine or at least the speed of the ship is not ordinarily changed unless the R. P. M. of the engine is changed. A means for causing the device to be responsive to changes in speed, therefore, would be to actuate the same by changes in revolutions per minute of the engine. For this purpose we have shown diagrammatically a R. P. M. indicator 60 illustrated as geared through the flexible shaft 61 to the propeller shaft 62, this figure being, of course, entirely diagrammatical. Said indicator is shown as provided with an indicating hand 63 readable upon the dial 64 graduated in revolutions per minute. Said indicator is also equipped with two other hands 65 and 65' which may be driven by a suitable clockwork (not shown) within the indicator. Each of hands 65 and 65' is frictionally mounted on its spindle and is provided with a contact 66, 66', which, when brought into contact with contact 67 on central hand 63, completes a circuit through the delayed action relay 75 actuating the magnet 26. Contact 66 is also in circuit with a solenoid 68' within the indicator, while contact 66' is in circuit with a second solenoid 68. Said solenoids are each provided with a stop pin 69, 69' secured to armatures 70 which are normally retracted by the compression spring 71. When either solenoid is excited the pin is forced forward and engages the escapement 72 or 72', as the case may be, of the clockwork, thereby stopping the same. Escapement 72 serves to revolve hand 65 counterclockwise while escapement 72' revolves hand 65' clockwise. The action of this device is, therefore, as follows: As long as the speed remains the same the three hands 63, 65, and 65' are together, the circuits closed, and all clockwork stopped. Also, the magnet 75 is excited and thereby the switch 76 in circuit with the magnet 26 is held open. If, however, the engine speed changes, for instance increases, the hand 63 moves away from the hand 65 but carries hand 65' with it, thereby breaking the circuit to solenoid 68' and starting the clockwise 72' by the release of the escapement. The clockwork then slowly revolves the hand 65 counterclockwise until it catches up with the hand 63 thereby completing the circuit through solenoid 68' and stopping the clockwork. Similarly, if the ship slows down the hand 63 moves away from the hand 65' causing the actuation of the escapement 72 thereby moving the hand 65' clockwise until it catches up with the hand 63.

Figure 8:
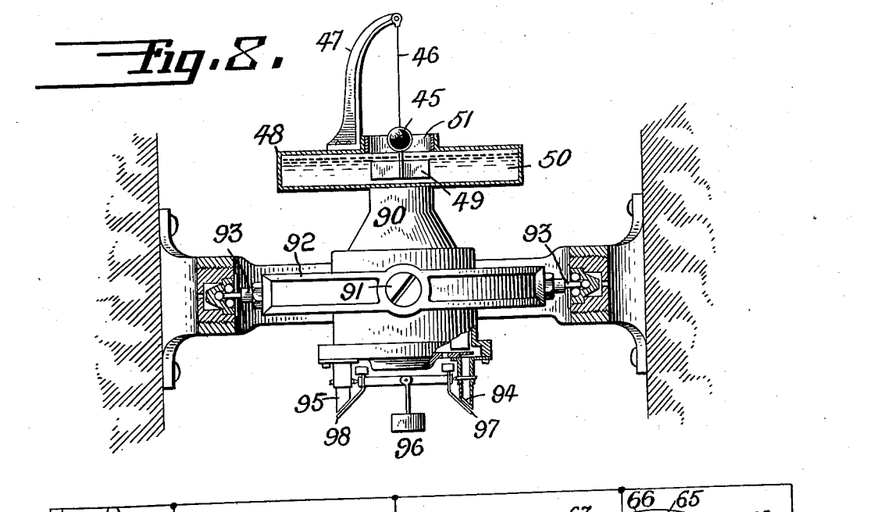
Fig. 8 is a side elevation, partly in section, of the control means shown diagrammatically in Fig. 6.

For rendering the device responsive to the turning of the ship, I have shown a direction responsive device such as a repeater compass 90 actuated in the usual manner from a transmitter 91 on the master gyro compass, such as shown in Figs. 1 to 7 in any well known manner. A repeater motor 92 in circuit with said transmitter is mounted within the repeater compass and is geared to rotate the card 90′ by gearing such as a pinion on the shaft 94 of the repeater motor meshing with large gear 95 on the card. Mounted to rotate with the compass card but preferably adjustable with respect thereto is a hand 163 corresponding to the hand 63, while on either side of said hand is mounted clock-driven secondary hands 165 and 165′. These hands correspond in function and structure to the hands 65 and 65′ on the R. P. M. indicator so that when the ship turns in one direction the hand 163 moves away from and breaks the contact with one of hands 165 or 165′ and when it turns in the other direction contact with the other hand is broken thereby setting in operation the proper clockwork by the excitation of solenoid 168 or 168′ thereby releasing the proper escapement 172, 172′ to revolve the hands in the direction to catch up with the compass hand 163. The relay 75 is preferably a delayed action relay in order that the yawing of the ship or momentary variations in the engine speed will not affect the compass. For this purpose a dashpot 59′ is shown which, in this case, imposes greater resistance to the action of the spring 58′ than to the magnet 75 since the magnet 75 is in a closed circuit system while the magnet 55 described in connection with Figs. 6 and 8 is in an open circuit system. When the circuit through the magnet 75 is broken, therefore, contacts 76 under the action of spring 58′ and dashpot 59′ will be slowly closed and the circuit completed through the magnet 26 on the gyro compass.

From the foregoing description it will readily be apparent that in all forms of the invention the cause of inclination of the compass on acceleration of the ship, in the broad sense of the term, will be eliminated since means are provided for eliminating all damping effect as soon as the ship starts to turn in either direction or change speed either positively or negatively. Also, it will be apparent that as I have devised a means for eliminating the disturbing action of the damper, a greatly increased damping effort may be employed without disturbing the compass. By such means, as above explained, the period of settling of the compass when displaced through a large angle may be greatly reduced. I, therefore, prefer to employ in my compass a larger angle of eccentricity than now employed in the standard compasses of the type disclosed in this application. Thus, the best practice is now considered to offset the point of connection between the ballistic and the sensitive element 2° or less, whereas according to my invention I may offset the connection as much as 4 or 5 degrees, thereby making an absolutely dead beat compass with all the attendant advantages of quick settling and without the disadvantages and being more free from the disturbing effect of the acceleration pressures than the present type of compass by reason of the temporary elimination of the damping during the application of acceleration forces. While in my invention the gyro compass is complicated to a slight extent by the addition of an extra mechanism, at the same time greater accuracy is secured, which, especially for ordnance work, will more than overbalance the additional slight complication.

In accordance with the provisions of the patent statutes, I have herein described the principal of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a gyro compass, the combination with a device for damping out oscillations of the compass about its meridian position, of means whereby such device may be rendered temporarily inoperative.

2. In a gyro compass, the combination with a device for damping out oscillations of the compass about its meridian position, of automatic means for temporarily rendering the damping device inoperative.

3. In a gyro compass, the combination with a device for damping out oscillations of the compass about its meridian position, of electrical means whereby the damping device may be temporarily rendered inoperative.

4. In a gyro compass, the combination with a device for damping out oscillations of the compass about its meridian position, of means whereby the damping action may be greatly reduced during turns.

5. The combination with a gyro compass having a sensitive element, a follow-up system, and a yielding eccentric connection between the two, of means responsive to uncancelled acceleration pressures for varying the eccentricity of said connection.

6. The combination with a gyro compass having a sensitive element, a follow-up system, and a yielding eccentric connection between the two, of means responsive to acceleration pressures for moving said connection substantially to the center position.

7. The combination with a gyro compass having a means for exerting a torque about its vertical axis, of a device responsive to uncancelled acceleration pressures, means for rendering said first named means inoperative, and delayed action means controlled by said device for actuating said second named means.

8. In a gyro compass adapted to be mounted on a ship or other moving vehicle, the combination with a sensitive element, of a member pivotally mounted adjacent thereto for imparting meridian-seeking properties thereto, means connecting said element and member, and means for varying the said point of connection when the ship changes speed or course.

9. The combination with a gyro compass having a sensitive element, means connected thereto adapted to impart both meridian seeking and inclination reducing properties thereto, and means for varying the connection between said sensitive element and said first named means to eliminate or reduce the inclination reducing property.

10. The combination with a gyro compass having a sensitive element, means connected thereto adapted to impart both meridian seeking and inclination reducing properties thereto, and means responsive to continued acceleration pressures for relatively changing the positions of said element and the first-named means to vary the inclination reducing property.

11. A gyro compass having an inclination reducing means of sufficient effectiveness to render the same substantially dead beat, and means for temporarily reducing the effectiveness of such means when the same would cause deviation.

12. The combination with a gyro compass having a sensitive element, a follow-up system, and a yielding eccentric connection between the two, of means responsive to acceleration for reversing the eccentricity of said connection.

13. The combination with a gyro compass having an eccentric inclination reducing means, of a device responsive to acceleration pressures, means for changing said means from an inclination reducing to an inclination increasing means, and means controlled by said device for actuating said last named means.

14. The combination with a gyro compass having a sensitive element, a follow-up system, and a yielding eccentric connection between the two, of means whereby the eccentricity of said connection may be reversed without disturbing the compass.

15. The combination with a gyro compass having a sensitive element, a follow-up system, and a yielding connection between the two normally eccentric to the vertical centerline of said element, of means responsive to acceleration for moving said connection to or slightly beyond said center line position.

16. In a gyroscopic compass for moving vehicles, a sensitive element, a follow-up support, a movable connection between said element and support, and means adapted to be set in accordance with changes in speed of the vehicle on which the compass is mounted for moving said connection to reduce deviation from such cause.

17. In a gyroscopic compass for moving vehicles, a sensitive element, a follow-up support, a movable connection between said element and support, and means adapted to be set in accordance with turning of the vehicle on which the compass is mounted for moving said connection to reduce deviation from such cause.

18. In a gyroscopic compass for moving vehicles, a sensitive element, a follow-up support, a movable connection between said element and support, and means adapted to be set in accordance with changes in speed and course of the vehicle on which the compass is mounted for moving said connection to reduce deviation from such cause.

19. In a gyroscopic compass for moving vehicles, a sensitive element, a follow-up element, means mounted on the follow-up element for exerting a torque on the sensitive element, and means adapted to be moved by or in accordance with changes in the speed or course of the vehicle for altering the point of application of said torque.

20. In a gyroscopic compass for moving vehicles, the combination with the sensitive element, of means acted upon by gravity connected with said element, and automatic means responsive to change in course of the vehicle for altering the application of said gravitational means on said element.

21. In a gyroscopic compass for moving vehicles, the combination with the sensitive element, of means acted upon by gravity connected with said element and automatic means responsive to change in speed of the vehicle for altering the application of said gravitational means on said element.

22. In a gyroscopic compass, the combination with the sensitive and follow-up elements, of a gravity control device, means for pivotally supporting the same on the follow-up element on a horizontal axis, an arm pivoted on said means at right angles to the axis of support of said device, said arm having a slidable connection with said sensitive element, and means for turning said arm on its pivot.

23. In a gyroscopic compass, the combination with the sensitive and follow-up elements, of a pair of liquid containers, means for pivotally supporting the same on the follow-up element on a horizontal axis, an arm pivoted to a container at right angles to the axis of support of said device, said arm having a slidable connection with said sensitive element, and means for turning said arm on its pivot.

24. In a gyroscopic compass, the combination with the sensitive and follow-up elements, of a pair of liquid containers, means for pivotally supporting the same on the follow-up element on a horizontal axis, an arm pivoted to a container at right angles to the axis of support of said device, said arm having a slidable connection with said sensitive element, and electromagnetic means controllable from a distance for turning said arm on its pivot.

In testimony whereof I have affixed my signature.

HERBERT H. THOMPSON.